(12) United States Patent
Mater

(10) Patent No.: US 7,317,541 B2
(45) Date of Patent: Jan. 8, 2008

(54) INTERFEROMETRY METHOD BASED ON THE WAVELENGTH DRIFT OF AN ILLUMINATION SOURCE

(75) Inventor: Michael J. Mater, Kentwood, MI (US)

(73) Assignee: Coherix, Inc., Ann Arbor, MI (US)

( * ) Notice: Subject to any disclaimer, the term of this patent is extended or adjusted under 35 U.S.C. 154(b) by 83 days.

(21) Appl. No.: 10/349,651

(22) Filed: Jan. 23, 2003

(65) Prior Publication Data

US 2003/0142317 A1 Jul. 31, 2003

Related U.S. Application Data

(60) Provisional application No. 60/351,730, filed on Jan. 25, 2002.

(51) Int. Cl.
*G01B 9/02* (2006.01)
(52) U.S. Cl. ..................................................... 356/512
(58) Field of Classification Search ........ 356/511–515, 356/489, 495
See application file for complete search history.

(56) References Cited

U.S. PATENT DOCUMENTS

| | | | |
|---|---|---|---|
| 5,706,085 A | | 1/1998 | Blossey et al. |
| 5,777,742 A | * | 7/1998 | Marron ........................ 356/511 |
| 5,880,841 A | * | 3/1999 | Marron et al. ............... 356/512 |
| 5,907,404 A | * | 5/1999 | Marron et al. ............... 356/489 |
| 5,926,277 A | * | 7/1999 | Marron et al. ............... 356/512 |
| 6,359,692 B1 | * | 3/2002 | Groot .......................... 356/512 |

OTHER PUBLICATIONS

Patrick Sandoz et al, "Phase shifting methods for interferometers using laser-diode frequency-modulation", Optics Communications, Dec. 1, 1996, pp. 227-231.
Masakazu Suematsu et al, "Wavelength-shift interferometry for distance measurements using the Fourier transform technique for fringe analysis", Applied Optics, Oct. 1, 1991, pp. 4046-4055.
John Hayes, "Dynamic interferometry handles vibration", Laser Focus World, Mar. 2002, p. 109.

* cited by examiner

*Primary Examiner*—Samuel A. Turner
(74) *Attorney, Agent, or Firm*—Jeffrey Schox

(57) ABSTRACT

An interferometry method using a laser of nominally fixed—but unknown and changing—frequency and phase angle, for example, attributable to laser drift. The interference pattern is periodically sampled at a frequency considerably higher than the phase shift of the object. The wavelength is reconstructed from the sampled patterns using a correlation algorithm. The phase angle is determined using an n-bucket algorithm. After all of the complex information has been determined at all of the multiple wavelengths, the surface of the object is calculated using conventional interferometry techniques. Accordingly, laser drift—typically considered a negative attribute—is used positively.

12 Claims, 5 Drawing Sheets

Table 1 - Measurement Diagram
Example of frames captured during a measure.

| Frame | Fringe Image | Correlation to Frame 32 | Estimated Phase Shift from Frame 32 | Actual Phase Shift from Frame 32 |
|---|---|---|---|---|
| 1 |  | 7114.373 | 260.000 | 260.000 |
| 2 |  | 8029.304 | 240.335 | 240.000 |
| 3 |  | 8727.070 | 220.000 | 220.000 |
| 4 |  | 9130.588 | 201.071 | 200.000 |
| 5 |  | 9287.154 | 180 | 180.000 |
| 6 |  | 9130.588 | 158.929 | 160.000 |
| 7 |  | 8727.070 | 140.000 | 140.000 |
| 8 |  | 8029.304 | 119.665 | 120.000 |
| 9 |  | 7114.373 | 100.000 | 100.000 |
| 10 |  | 5959.568 | 79.837 | 80.000 |
| 11 |  | 4643.577 | 60.000 | 60.000 |
| 12 |  | 3171.020 | 39.929 | 40.000 |
| 13 |  | 1612.697 | 20.000 | 20.000 |
| 14 |  | 0 | 0 | 0 |
| 15 |  | 1612.697 | 340.000 | 340.000 |
| 16 |  | 3171.020 | 320.071 | 320.000 |
| 17 |  | 4643.577 | 300.000 | 300.000 |
| 18 |  | 5959.568 | 280.163 | 280.000 |
| 19 |  | 7114.373 | 260.000 | 260.000 |

| 20 |  | 8029.304 | 240.335 | 240.000 |
|---|---|---|---|---|
| 21 |  | 8727.070 | 220.000 | 220.000 |
| 22 |  | 9130.588 | 201.071 | 200.000 |
| 23 |  | 9287.154 | 180 | 180.000 |
| 24 |  | 9130.588 | 158.929 | 160.000 |
| 25 |  | 8727.070 | 140.000 | 140.000 |
| 26 |  | 8029.304 | 119.665 | 120.000 |
| 27 |  | 7114.373 | 100.000 | 100.000 |
| 28 |  | 5959.568 | 79.837 | 80.000 |
| 29 |  | 4643.577 | 60.000 | 60.000 |
| 30 |  | 3171.020 | 39.929 | 40.000 |
| 31 |  | 1612.697 | 20.000 | 20.000 |
| 32 |  | 0 | 0 | 0 |

INTERFEROMETRY METHOD BASED ON THE WAVELENGTH DRIFT OF AN ILLUMINATION SOURCE

This application claims priority from U.S. Provisional Application No. 60/351,730 filed Jan. 25, 2002 entitled "Interferometer with Measurement Correction Based on Phase Change".

BACKGROUND OF THE INVENTION

The present invention relates to interferometry methods, and more particularly to interferometry methods using illumination sources with varying wavelengths, such as tunable lasers.

Phase-shifting interferometers are known to those skilled in the interferometry art. Exemplary systems are available from both Zygo Corporation of Middlefield, Conn. (www.zygo.com) and Veeco Instruments Inc. of Woodbury, N.Y. (www.veeco.com). Typically, these systems use either a single-wavelength laser or "white" (i.e. polychromatic) light.

Single-wavelength interferometers have traditionally used gas lasers such as helium neon (HeNe). More recently, the single-wavelength systems have begun to use diode lasers in which the output wavelength can be controlled by controlling the temperature and forward current of the laser. Accordingly, single-wavelength systems typically do not suffer from wavelength drift and/or jitter.

White light systems utilize a broadband light source, either alone or in conjunction with a narrow-band interference filter. These systems also typically do not suffer from such degradation issues as wavelength drift.

More recently, multiple-wavelength interferometer systems have begun to enter the marketplace. These systems typically include a tunable laser to achieve their multi-wavelength performance. Many types of suitable tunable lasers exist, and examples include dye, titanium sapphire, Alexandrite, distributed feedback diode, distributed Bragg reflection diode, and external cavity diode. At present, the tunable diode lasers are the most cost effective in commercial applications. Unfortunately, the wavelength output of diode lasers varies as a function of temperature and forward current (and other parameters). Modern electronic control circuitry, while advanced, is unable to regulate the temperature and forward current (and other parameters) adequately to stabilize the laser so that the wavelength does not drift or jitter. For example, external cavity tunable lasers depend on the electromechanical movement of the external cavity, which sometimes contains a grating and/or a mirror. There is a tendency for these systems to drift and jitter in wavelength as the electronic control attempts to stabilize the laser by modifying the temperature, forward current, and position of the grating.

Interferometers are sufficiently sensitive so that wavelength variation on the order of one hundred (100) picometers or less can translate into potential phase error in an unequal path length interferometer. Accordingly, multiple-wavelength interferometers and laser radar systems utilizing such lasers have resulted in less than desirable performance due to laser drift and jitter.

SUMMARY OF THE INVENTION

The aforementioned problems are overcome in the present interferometry method wherein the interference pattern is sampled at a frequency significantly greater than the phase shift of the object. The wavelength and its phase angle are reconstructed from the sampled interference patterns. Based on this reconstruction, the surface of the object is calculated using known techniques.

The present invention converts the previously considered negative attributes of drift and jitter into a positive attribute used in reconstructing the wavelength and its phase angle. The drift and/or jitter of the laser is a positive—not a negative—in the interferometry method. Accordingly, because the method is capable of reconstructing the wavelength regardless of the actual (as opposed to nominal) frequency and phase angle, the present invention results in interferometry of enhanced quality using relatively inexpensive lasers.

The present method is based on the assumption that the laser will have drift and/or jitter—either inherent or induced. In an unequal path length interferometer, the drift and jitter will be perceived as phase change. By capturing continuous frames of information at a rate fast enough to sample the phase change seen in the interferometer after the laser has been commanded to move to the next wavelength, the amount of phase error in the different frames can be determined by the correlation of individual pixels within an area within the field of view of the interferometer.

The present invention is applicable to both speckle and non-speckle interferometers.

These and other objects, advantages, and features of the invention will be more fully understood and appreciated by reference to the detailed description of the preferred embodiment and the drawings.

DETAILED DESCRIPTION OF THE PREFERRED EMBODIMENT

Figure 1:
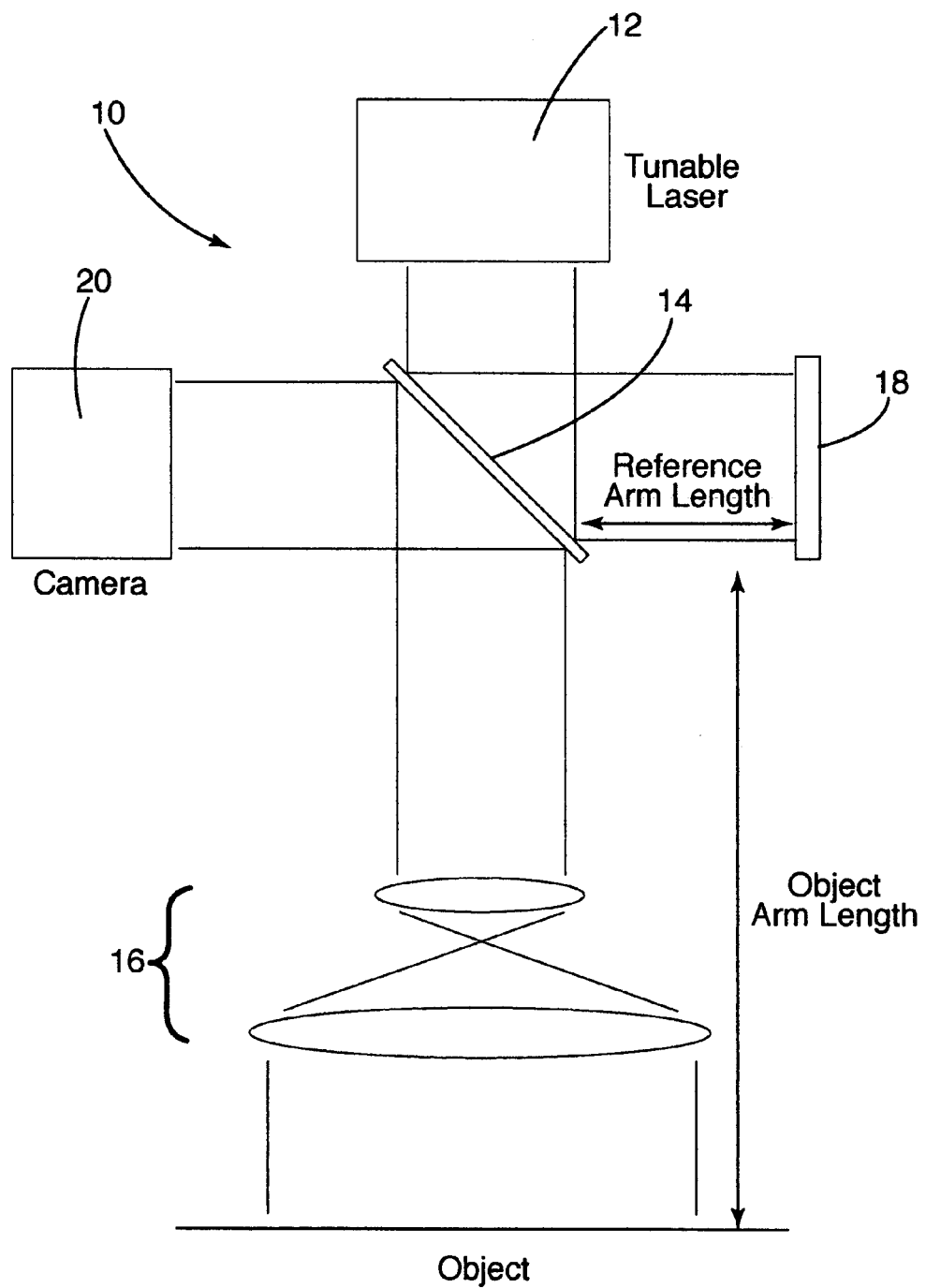
FIG. 1 is a schematic illustration of an interferometer having unequal path lengths suitable for use in conjunction with the present interferometry method.

The method of the present invention can be used in conjunction with a wide variety of interferometers. The present method is particularly suited to unequal path length interferometers such as Twyman Green, Michelson, Fizeau, Fabry Perot, and Mach Zender. The exemplary interferometer 10 illustrated in FIG. 1 is a Michelson interferometer, in which the object arm path length is much longer than the reference arm path length. The Michelson interferometer 10 includes a tunable laser 12, a beam splitter 14, an optics assembly 16, a reference mirror 18, and a camera 20. The interferometer 10 further includes a piezo (not shown) for moving the reference mirror 18 to produce a desired phase shift. By using multiple wavelengths and capturing n phases (currently four phases at 0, 90, 180, and 270 degrees) of data at each wavelength, the object surface height can be reconstructed with a known ambiguity.

In the prototype interferometer, the laser 12 is the diode laser sold as Model 6316 by New Focus Inc. of San Jose, Calif. Such lasers do not settle out to the commanded wavelength and indeed drift after tuning to a desired wavelength. Absent the present invention, this drift causes the fringes to move and phase errors to occur just as if the reference mirror 18 were physically moving.

If the two path lengths (i.e. the reference arm path length and the object arm path length) were equal, the small amount of laser drift would not significantly affect the phase. However, as the ratio of the reference arm to the object arm increases, the phase is significantly affected by a variety of factors. Wavelength independence is one of the crucial factors that is enhanced using the method of the present invention.

Figure 2A:
FIGS. 2A and 2B together illustrate examples of interference pattern frames captured for a given nominal wavelength using the present interferometry method.
Figure 2A:
Figure 2A:
Figure 2A:
Figure 2A:
Figure 2A:
Figure 2A:
Figure 2A:
Figure 2A:
Figure 2A:
Figure 2A:
Figure 2A:
Figure 2A:
Figure 2A:
Figure 2A:
Figure 2A:
Figure 2A:
Figure 2A:
Figure 2A:
Figure 2B:
Figure 2B:
Figure 2B:
Figure 2B:
Figure 2B:
Figure 2B:
Figure 2B:
Figure 2B:
Figure 2B:
Figure 2B:
Figure 2B:
Figure 2B:
Figure 2B:

In the method of the present invention, the interference pattern or interferograph is sampled at a frequency significantly higher or greater than the phase shift of the object. Specifically in the disclosed embodiment, the interference pattern is sampled at a rate at approximately 18 times before the object phase shifts 360 degrees. It is believed that a sampling rate of approximately an order of magnitude greater than the phase shift of the object is a minimum for an implementation of the present method. A sampling rate 18 times that of the laser simplifies some of the subsequent processing because the frames are 20 degrees separated from one another. In the present embodiment, 32 frames are sampled. FIGS. 2A and 2B (collectively referred to as FIG. 2) illustrate 32 sequential fringe images collected during the present method.

The second column of FIG. 2, entitled "Correlation to Frame 32" sets forth the correlation of that frame to an arbitrarily selected reference frame. In the present invention, frame 32, or the "last" frame, is arbitrarily selected as the reference frame. The method for calculating the correlation between two frames (or a sub area within each frame) is performed by taking the sum of all of the absolute values of the different frames for each pixel. This methodology is not a mathematical correlation, which is usually a summation of multiplications, but more of a subtraction. The resulting sum is always positive and removes the offset that varies for each pixel, which allows the correlation to relate to the phase shift which respect to the reference frame. In FIG. 2, a relatively low number indicates a relatively high correlation, and conversely a relatively high number indicates a relatively low correlation.

The next step in the process is to calculate the phase angle of each frame based on the correlation of that frame to the reference frame. The equation for calculating the phase angle is:

$$\text{Angle}=180-(\text{acos}(\text{Corr}/\text{MaxCorr})*360/\pi$$

where Corr is the correlation of the frame; and
MaxCorr is the frame with the highest (i.e. worst) correlation The "Estimated Phase Shift from Frame 32" calculated using the previous equation is included in the third column of FIG. 2. The frames that correlate identically (i.e. frames 14 and 32) have a phase shift of zero. The phase shifts of the other frames are approximately 20 degrees separated from one another.

Finally, the "Actual Phase Shift from Frame 32" is determined by rounding the estimated or calculated phase shift. This "Actual Phase Shift from Frame 32" is set forth in the fourth column of FIG. 2. The error in the phase calculation is not significant to the disclosed embodiment.

The disclosed calculations of the present invention are based on several assumptions. The first assumption is that the laser "mini-sweep" or "drift" is continuous in a single direction. The drift does not have to be linear with time or capture rate. However, the capture rate is fast enough (in comparison to the speed of the drift) so that the frames are captured as they drift. The drift is slow enough so that the draft does not blur the fringes and cause significant error in the phase reconstruction.

The second assumption is that the amount of drift is an order of magnitude less than the commanded laser step. However, this assumption does not always have to be true. The amount of imbalance in the interferometer arms can be used to calculate the wavelength change and stability during the sweep of the laser.

The third assumption is that the reference path length and the object path length are held completely stable and do not change during the measurement.

The fourth assumption is that the object being measured has surface features of interest with acceptable unbalanced distances. Difference in the surface features of interest with the lowest unbalanced ratio compared to the features with the largest unbalanced ratio are small, and therefore can be ignored.

Figure 3A:
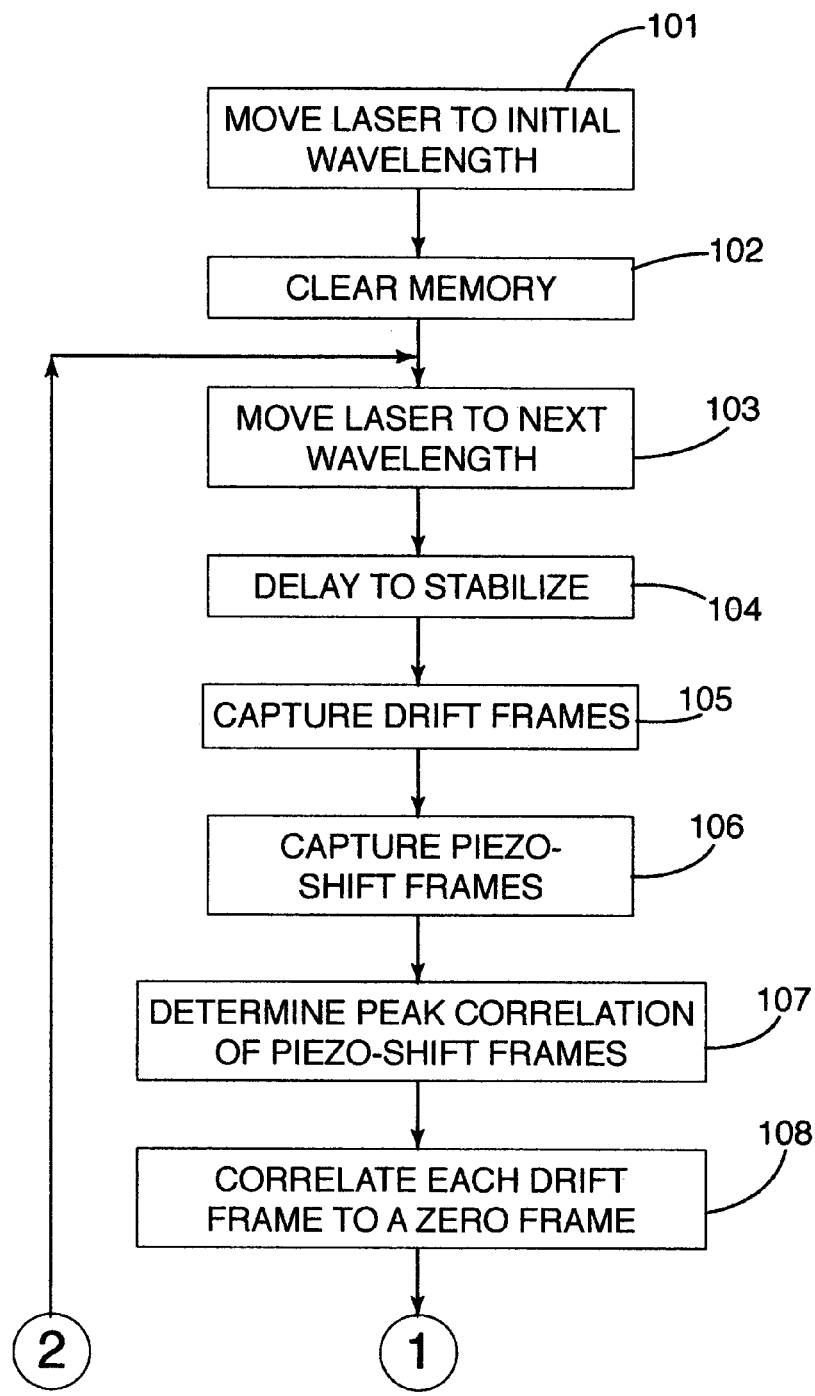
FIGS. 3A and 3B together provided a flow chart illustrating the method of the present invention.
Figure 3B:
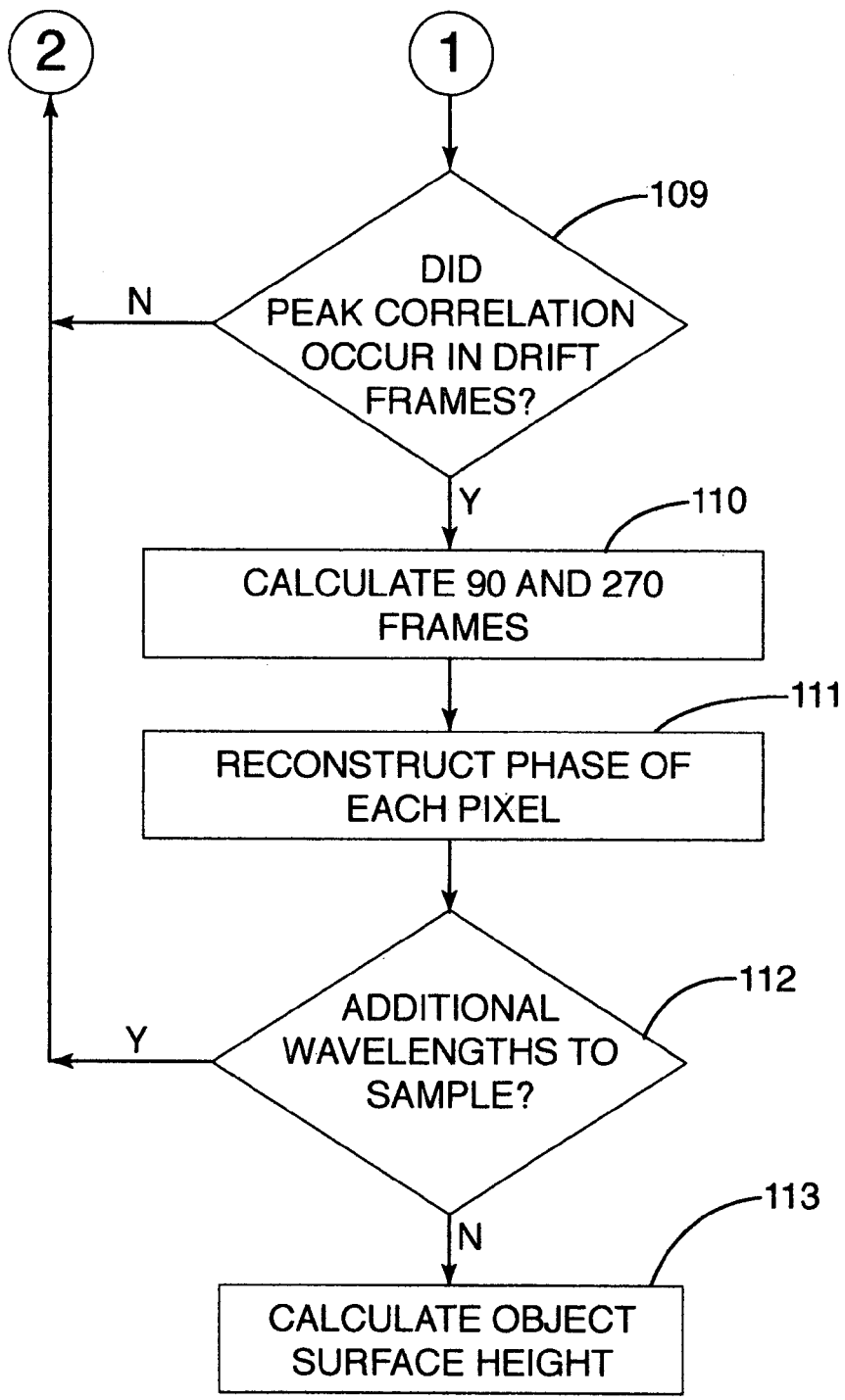

FIGS. 3A and 3B (collectively FIG. 3) sets forth the steps of the present invention to acquire a point cloud of Z heights. First, the laser is moved 101 to an initial or starting wavelength. The disclosed New Focus laser has a tunable range of 827 nanometer (nm) to 852 nm. The initial wavelength is arbitrarily chosen as the shortest wavelength of 827 nm.

Second, the internal images and other measurement frames are cleared 102 from memory.

Third, the laser is commanded to move 103 to the next wavelength, which is arbitrarily chosen as a step of one nm. So, the first move (from the initial move) is from 827 nm to 828 nm.

Fourth, a short delay (e.g. two seconds) is introduced 104 to allow the laser to move to and to stabilize at the new wavelength.

Fifth, the system captures 105 thirty-two (32) frames of data. During sampling, the laser drifts from the commanded or nominal wavelength, but in a range much less than 1 nm. In fact, the draft is in the range of about 0.001 nm (i.e. 1 picometer). Because the interferometer is unbalanced, this drift appears as a phase shift from the commanded wavelength. These frames are referred to as "drift" frames because they are acquired while the laser is presumably drifting.

Sixth, using a traditional methodology, the piezo is actuated to shift the mirror 18 so that four additional frames are captured 106 at 0, 90, 180, and 270. These frames are referred to as piezo-shift frames because they are acquired while the reference mirror is physically moved by the piezo. If desired, more than four piezo-shift frames can be captured to improve phase accuracy.

Seventh, the 0 and 180-degree piezo-shift frames are calculated, and the 90 and 270-degree piezo-shift frames are correlated to determine 107 what the peak correlation should be for the drift frames.

Eighth, the last captured drift frame is designated the reference frame, and the correlation value is calculated 108 for each drift frame on a pixel-by-pixel basis. Summing the absolute value of the pixel differences provides a correlation to the reference frame. This correlation can be performed over the entire field of view or over a subset area of the image. The present methodology utilizes the center half of the image.

Ninth, the worst-case correlation in drift frames is compared 109 with the correlation between the piezo-shifted frames to determine whether the laser has drifted enough to cause at least one complete wavelength of shift. If such a shift did not occur, only the piezo-shifted frames are used in subsequent processing. In that case, the assumption is that the laser was stable during the drift and therefore was still stable during the piezo-shift as well. In this case, the method shifts to step 103.

Tenth, the 90 and 270-degree frames are identified 110 as those whose correlations are 0.707 (Cos 45) of the maximum correlation. The two frames can be distinguished because of the continuous drift in the same direction.

Eleventh, based on the modulation of the drift frames and the piezo-shifted frames, the phase is reconstructed 111 for each pixel. In the preferred embodiment, the algorithm used in the reconstruction is a conventional four-bucket algorithm well know to those skilled in the interferometry art. The frame with the worst correlation is assumed to be 180 degrees out of phase with the reference frame. Frames that are 0.707 (Cos 45°) of the worst-case correlation error are either 90 or 270 degrees out of phase. Using a standard four-bucket phase unwrapping method, the complex surface vector is calculated at each pixel. Algorithms for phase reconstruction that use more than a four-bucket algorithm also can be used. In fact, an n-bucket algorithm can be used where all frames within the sweep are utilized.

Twelfth, a check is made to determine whether additional wavelengths are to be sampled 112. If yes, program flow returns to step 103. If no, program flow continues to step 113. Steps 103 through 112 are repeated until all wavelengths have been measured.

Thirteenth, after all of the complex information has been collected, the surface height of the object is calculated 113 using standard synthetic aperture radar (SAR) techniques well known to those in interferometry.

The benefits of the present invention are numerous. First, laser stability is not a requirement. Indeed, the invention takes positive advantage of any laser instability. Second, the invention enables the reference arm length to be significantly reduced, which reduces the size of the overall system. Third, the invention makes constructive use of the time required for the laser to stabilize to aid in phase reconstruction. Fourth, the draft frames and their subsequent processing are independent of the calibration of the reference arm, noise, temperature, humidity, hysteresis, and electrical errors induced with the piezo-shifting system. Fifth, the invention produces more phase data sets without requiring additional time to move a piezo. Sixth, the invention eliminates the need to coordinate the piezo and frame capture.

As an alternative embodiment, the laser could be forced to drift to ensure at least one complete cycle of wavelength. Such an embodiment would eliminate the need to use the piezo-shift method at all. As another alternative embodiment, the laser could be forced to continuously sweep to obtain large-ambiguity, high-resolution measurements.

The above description is that of a preferred embodiment of the invention. Various alterations and changes can be made without departing from the spirit and broader aspects of the invention as defined in the appended claims, which are to be interpreted in accordance with the principles of patent law including the doctrine of equivalents.

The embodiments of the invention in which an exclusive property or privilege is claimed are defined as follows:

1. A method for creating an image of an object comprising the steps of:
    a) setting an illumination source at an initial nominal wavelength;
    b) illuminating an object with an illumination source to create interference patterns;
    c) allowing the wavelength of the illumination source to drift from the nominal wavelength to a drift wavelength over a time period that causes a 360° shift in the phase angle of the interference patterns;
    d) sampling the interference patterns multiple times during the time period; and
    e) creating an image of the object based on the sampled information.

2. The method of claim 1, further comprising the step of setting the illumination source to a second nominal wavelength and repeating steps (b), (c), and (d).

3. The method of claim 2, wherein the difference between the initial nominal wavelength and the second nominal wavelength is about 1 nanometer.

4. The method of claim 1, wherein the illumination source is a tunable laser.

5. The method of claim 1, wherein the drift between the nominal wavelength and the drift wavelength is less than 1 nanometer.

6. The method of claim 5, wherein the drift between the nominal wavelength and the drift wavelength is about 1 picometer.

7. The method of claim 1, wherein step (d) includes sampling the interference patterns about 18 times during the time period.

8. The method of claim 1, wherein step (e) includes using a synthetic aperture radar technique.

9. The method of claim 1, further comprising, after steps (a), (b), (c), and (d), causing an additional shift in the phase angle of the interference patterns and sampling the interference patterns after the additional shift in the phase angle.

10. The method of claim 9, further comprising moving an object to cause the additional shift in the phase angle of the interference patterns.

11. The method of claim 1, further comprising the step of:
    f) using the image of the object.

12. The method of claim 1, further comprising the step of:
    f) calculating the surface of the object.

* * * * *